United States Patent [19]
Hedley et al.

[11] Patent Number: 5,181,111
[45] Date of Patent: Jan. 19, 1993

[54] VIDEO SIGNAL PROCESSING APPARATUS AND METHOD

[75] Inventors: David J. Hedley, Winchester; Martin R. Dorricott, Basingstoke, both of England

[73] Assignee: Sony Broadcast & Communications Limited, Basingstoke, England

[21] Appl. No.: 735,354

[22] Filed: Jul. 24, 1991

[30] Foreign Application Priority Data

Aug. 9, 1990 [GB] United Kingdom ................ 9017486

[51] Int. Cl.⁵ .......................... H04N 5/87; H04N 7/01
[52] U.S. Cl. ..................... 358/140; 358/105; 358/311; 358/346
[58] Field of Search ............... 358/105, 332, 345, 346, 358/311, 335, 216, 140

[56] References Cited

U.S. PATENT DOCUMENTS

| | | | |
|---|---|---|---|
| 4,754,342 | 6/1988 | Duffy | 358/335 |
| 4,835,626 | 5/1989 | Wilkinson | 358/311 |
| 4,972,274 | 11/1990 | Becker | 358/216 |
| 5,012,334 | 4/1991 | Etra | 358/311 |
| 5,016,101 | 5/1991 | Richards | 358/105 |
| 5,068,724 | 11/1991 | Krause | 358/105 |

*Primary Examiner*—Howard W. Britton
*Attorney, Agent, or Firm*—Alvin Sinderbrand; William S. Frommer

[57] ABSTRACT

Video signal processing apparatus, for example a television standards converter (12), for motion adaptive or motion compensated processing a video signal in dependence on inter-field or inter-frame information, comprises a reader (21) for reading scene discontinuity information relating to the video signal, which may be expressed in time codes, from a recording medium such as a magnetic disc, the apparatus being controlled in dependence on the read information to cause the processing of the video signal to change to being dependent on intra-field or intra-frame information at a scene discontinuity.

12 Claims, 15 Drawing Sheets

FIG. 8.
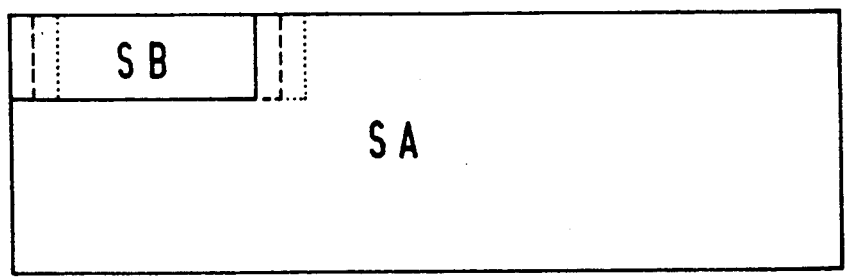
FIG. 9.
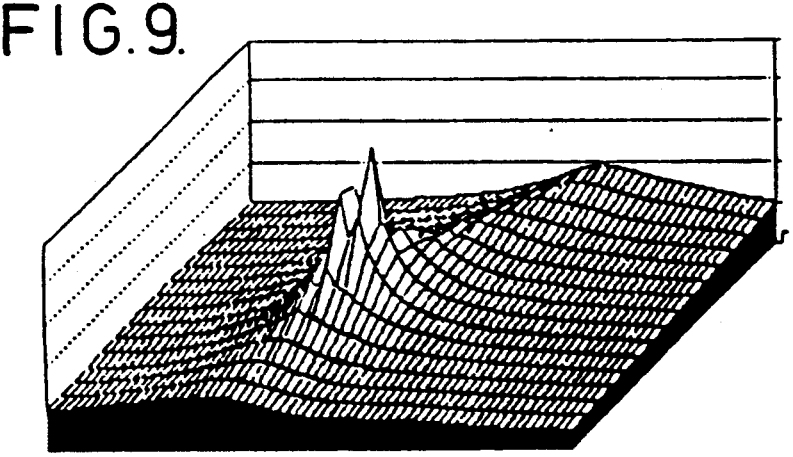
FIG. 10.
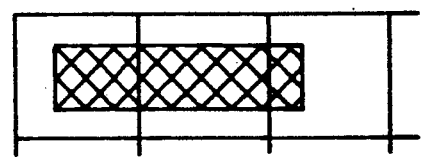
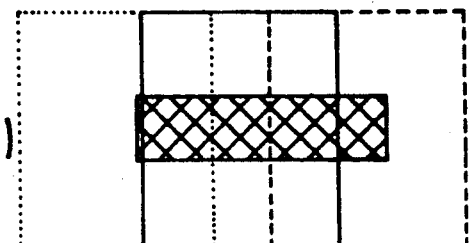

FIG. 20.

| C | C | C | C | C | C |
|---|---|---|---|---|---|
| C | C | B | B | B | B |
| C | C | B | A | A | A |
| C | C | B | A | A | A |
| C | C | B | A | A | A |
| C | C | B | A | A | A |

FIG. 21.

| a | b | c |
|---|---|---|
| d | ▨ | e |
| f | g | h |

REGION A

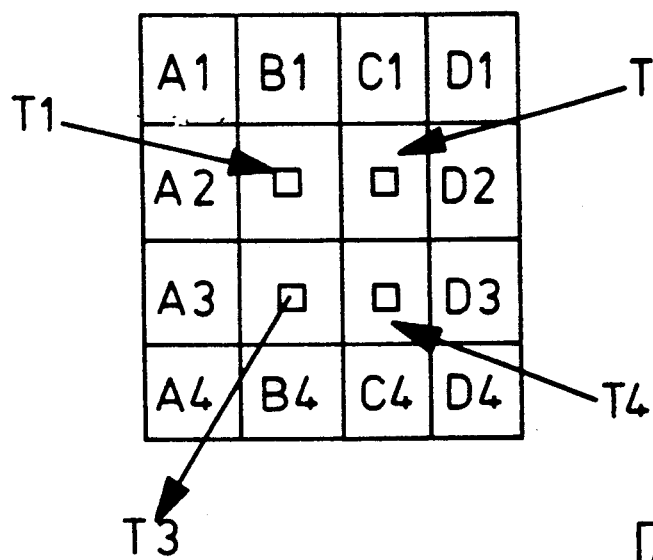
FIG. 26.
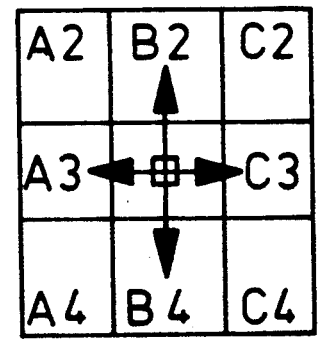
FIG. 27.
FIG. 28.
EDIT LIST
| SCENE NUMBER | SCENE CONTENT | TIME CODE |
|---|---|---|
| 1 | ----- | ----- |
| 2 | ----- | ---- |
| 3 | ---- | ---- |
| 4 | -- | -- |
| 5 | -. | -. |
| ⋮ | | |

VIDEO SIGNAL PROCESSING APPARATUS AND METHOD

BACKGROUND OF THE INVENTION

1. Field of the Invention

This invention relates to methods of and apparatus for video signal processing, and more particularly, but not exclusively, to methods of and apparatus for video signal processing in which temporal inter-frame processing is involved, such as in video signal to photographic film conversion.

2. Description of the Prior Art

FIG. 1 of the accompanying drawings shows in block diagrammatic form an apparatus which we have previously proposed for video signal to photographic film conversion. The apparatus comprises a video tape recorder (VTR) 1, a video signal converter 2, a gamma corrector 3, and an electron beam recorder (EBR) 4 interconnected as shown. Briefly, the operation is as follows.

The VTR 1 reproduces a high definition video signal (HDVS) comprising 60 interlace scanned fields per second. The converter 2 is a relatively simple device which produces from the reproduced video signal a converted video signal corresponding to a 24 progressive scan frames per second rate, formed by dropping every fifth input field and combining the remaining input fields to form progressive scan frames, which are supplied to the electron beam recorder 4 to be recorded on photographic film.

A problem with this apparatus is that if there is significant movement in a scene, then the conversion process used results in a very obtrusive 6 Hz motion judder component in the picture.

More sophisticated video signal converters are known in the form of video standards converters used to convert video signals from one television standard to another, for example, from a 625 lines per frame, 50 fields per second standard to a 525 lines per frame, 60 fields per second standard. Video standards conversion cannot be achieved satisfactorily merely by using simple linear interpolation techniques, because of the temporal and vertical alias which is present in a video signal. Thus, simple linear interpolation produces unwanted artefacts in the resulting picture, in particular, the pictures are blurred vertically and judder temporally.

To reduce these problems it has been proposed that video standards converters should use adaptive techniques to switch the parameters of a linear interpolator in dependence on the degree of movement in the picture represented by the incoming video signal.

It has also been proposed, for example for the purpose of data reduction in video signal processing, to generate motion vectors from an incoming video signal by a block matching technique, in which the content of a search block in one field or frame is compared with the respective contents of a plurality of search blocks comprised in a search area in the following field or frame, to determine the minimum difference between the contents so compared, and hence the direction and distance of motion (if any) of the content of the original search block.

In Sony Corporation U.S. Pat. No. 5,016,101 there is disclosed apparatus for converting a video signal to a photographic film image, and incorporating a motion compensated television standards converter. A problem with this apparatus, and which occurs generally in motion adaptive and motion compensated video signal processing methods and apparatus, is that in order to drive the signal processing accurately, the information derived about the motion of objects in the image must be accurate. A particular difficulty is that scene changes, and indeed cuts generally, wipes, fades and some other effects, appear to the detection circuitry as rapid random changes in motion. This can cause unpleasant artifacts in the output image, which may be even more noticeable if any post-processing is applied to the video signal.

SUMMARY OF THE INVENTION

One object of the present invention is to provide a method of motion adaptive or motion compensated video signal processing in dependence on inter-field or inter-frame information in which this difficulty is overcome.

Another object of the present invention is to provide video signal processing apparatus for motion adaptive or motion compensated processing a video signal in dependence on inter-field or inter-frame information in which this difficulty is overcome.

Another object of the present invention is to provide video signal processing apparatus for motion adaptive or motion compensated processing a video signal in dependence on inter-field or inter-frame information in which processing becomes dependent on intra-field or intra-frame information at a scene discontinuity.

According to the present invention there is provided a method of motion adaptive or motion compensated video signal processing based on inter-field or inter-frame information, wherein scene discontinuity information relating to the video signal and recorded on a recording medium is reproduced and used to cause the processing to change to being based on intra-field or intra-frame information at a scene discontinuity.

According to the present invention there is also provided video signal processing apparatus for motion adaptive or motion compensated processing a video signal in dependence on inter-field or inter-frame information, the apparatus comprising: means for reading scene discontinuity information relating to the video signal from a recording medium; and means to cause the processing of the video signal to change to be dependent on intra-field or intra-frame information at a scene discontinuity.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 7 and 8 show diagrammatically search blocks and search areas, and the relationships therebetween;

FIG. 9 shows a correlation surface;

FIG. 10 shows diagrammatically a moving object straddling three search blocks;

FIG. 20 shows motion vector regions in a frame of video;

FIGS. 21 to 23 show diagrams used in explaining motion vector reduction in respective regions of a frame of video;

FIGS. 26 and 27 show diagrammatically how a threshold is established during the motion vector selection;

FIG. 28 shows diagrammatically an edit list;

DESCRIPTION OF THE PREFERRED EMBODIMENT

The embodiment of video processing apparatus to be described is for video signal to photographic film conversion, and is particularly intended for use in the conversion of a high definition video signal (HDVS) having 1125 lines per frame, 60 fields per second, to 24 frames per second 35 mm film. However, it will be understood that the invention is not limited in this respect, and is widely applicable to other forms of video signal processing.

Figure 1:
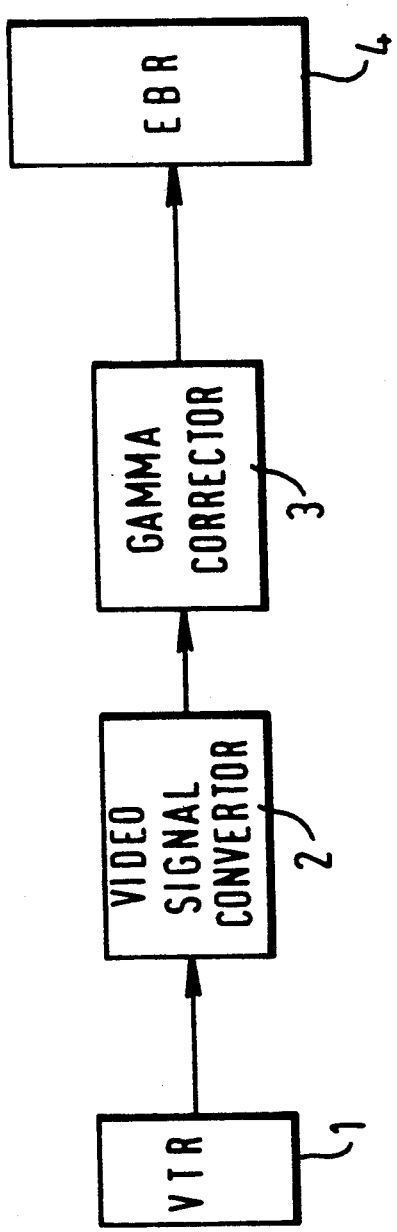
FIG. 1 is a block diagram of a previously proposed apparatus for video signal to photographic film conversion.
Figure 2:
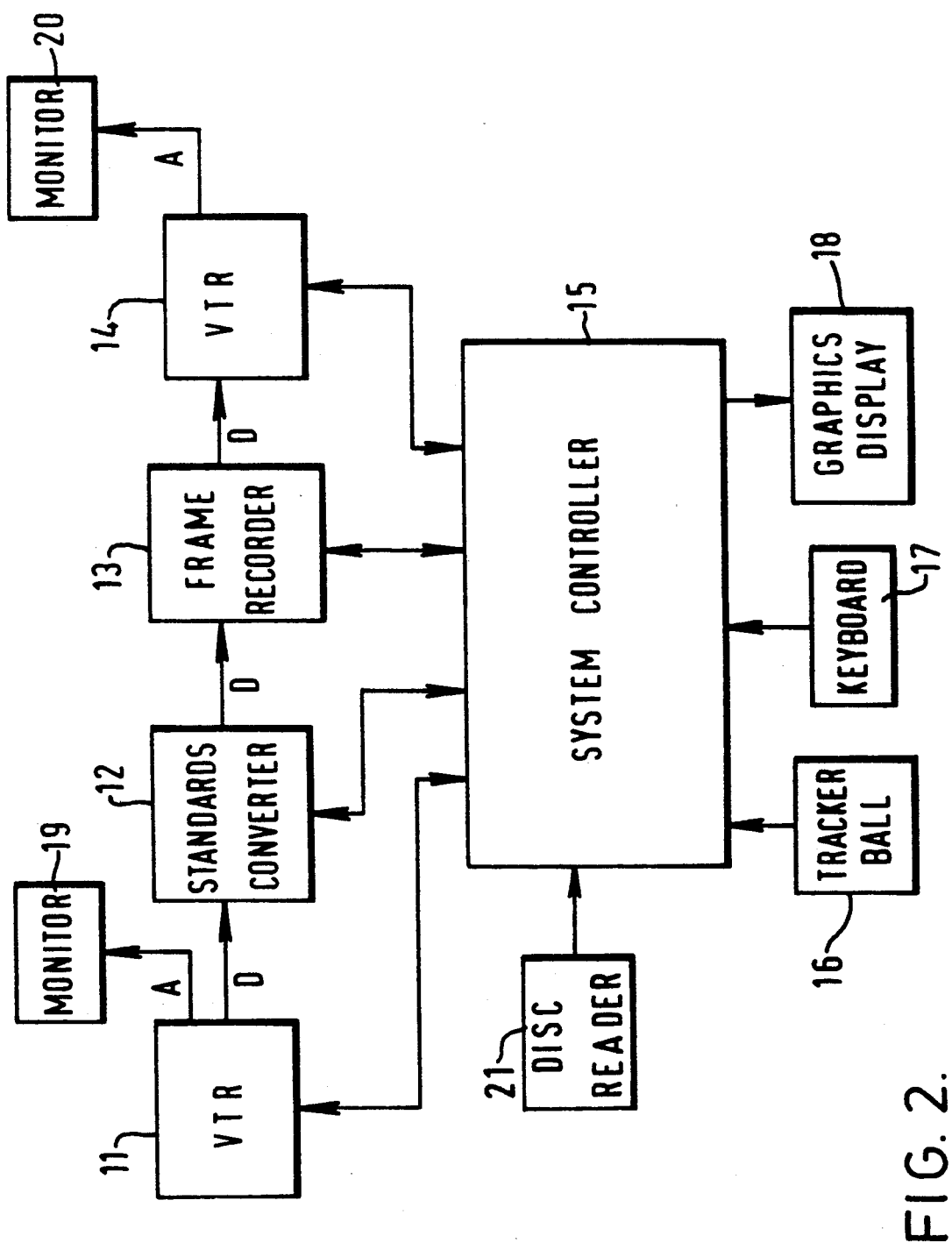
FIG. 2 is a block diagram of part of an embodiment of apparatus for video signal to photographic film conversion according to the present invention.
Figure 3:
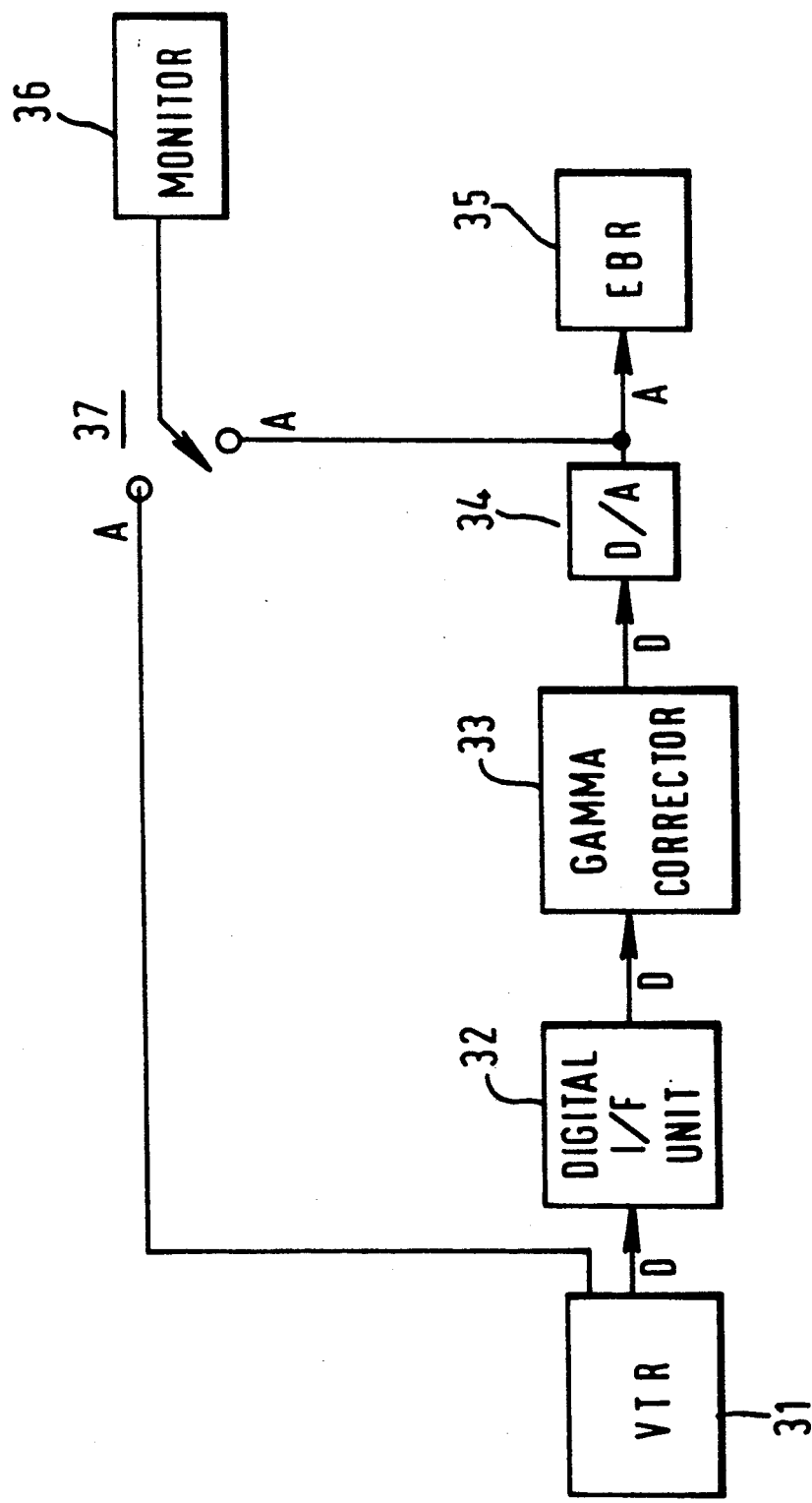
FIG. 3 is a block diagram of another part of the embodiment.

The apparatus can conveniently be considered in two parts; the first part, shown in FIG. 2, effects the conversion of the input HDVS to a progressive scan digital video signal corresponding to 24 frames per second which is recorded on a VTR; and the second part, shown in FIG. 3, reproduces the recorded video signal and transfers it to photographic film.

The part of the apparatus shown in FIG. 2 comprises a high definition digital VTR 11 which includes means for reading the time codes associated with the recorded video signal, a television standards converter 12, a frame recorder 13 which can record up to say one second of video signal, a second high definition digital VTR 14, a system controller 15 having associated with it a tracker ball control 16, a keyboard 17, a graphics display 18, and an edit list disc reader 21 referred to in detail below, and television monitors 19 and 20, interconnected as shown, and operating as will be described below.

The second part of the apparatus, shown in FIG. 3, comprises a high definition digital VTR 31, a digital interface (I/F) unit 32, a gamma corrector 33, a digital-to-analog converter 34, an electron beam recorder 35, a television monitor 36 and a switch 37, interconnected as shown, and operating as will be described below.

Referring again to FIG. 2, the video signal connections D are digital connections, that is carrying Y, U/V signals, and the video signal connections A are analog connections carrying R, G, B signals. The input video signal which is to be transferred to film, and which may have been derived from a high definition video camera, is recorded on a magnetic tape reproduced by the digital VTR 11. The digital VTR 11 is capable of reproducing the recorded video signal at ¼ speed, as this is a convenient speed of operation for the subsequence circuitry, and in particular the standards converter 12. The elements 11 to 14, 19 and 20 are under control of the system controller 15, the system controller 15 being in turn controllable by inputs from the tracker ball control 16 and the keyboard 17, and having associated with it the graphics display 18 on which is displayed information relating to the progress of the conversion, and the disc reader 21.

A portion of the input HDVS is reproduced from the digital VTR 11 and supplied to the standards converter 12. This operates, as described in detail below, to derive from the input video signal, which is a 60 fields per second interlace scanned video signal, firstly, a motion adapted progressive scan digital video signal at 60 frames per second, and then from this the required motion compensated progressive scan digital video signal corresponding to 24 frames per second, but not necessarily at that rate. This video signal is recorded by the digital VTR 14. The frame recorder 13 permits the intermittent operation which is required for video signal to film conversion, because the digital VTR 14 cannot record in slow motion, and to provide the ability to check at frequent intervals that the conversion is proceeding satisfactorily. Thus depending on the content of the video signal to be converted, adjustment of the parameters, in particular those of the standards converter 12, need to be made, and the results evaluated before proceeding. The monitors 19 and 20 are provided as further means for checking the video signal at respective points in the apparatus. The operation of the disc reader 21 is described below.

In the second part of the apparatus, shown in FIG. 3, the motion compensated progressive scan digital video signal recorded by the digital VTR 14 (FIG. 2) is reproduced by the digital VTR 31 and passed by way of the digital I/F unit 32 to the gamma corrector 33, the purpose of which is to match the gamma characteristics of the video signal to the gamma characteristics of the film being used. The separated operation permitted by the recording of the motion compensated progressive scan digital video signal by the digital VTR 14 (FIG. 2), for subsequent reproduction by the digital VTR 31, enables the gamma correction to be set accurately by the gamma corrector 33, because intermittent and repeated operation is possible so that various different mappings of the generally non-linear gamma characteristics of the video signal from the digital VTR 31 to the generally linear gamma characteristics of the film can be tested. This gamma setting may, for example, involve the use of a step wedge. The gamma corrected digital video signal is then converted to an analog signal by the digital-to-analog converter 34 and supplied to the electron beam recorder 35 to be recorded on photographic film. This recording may, for example, be in the form of three monochrome frames for each frame of the video signal, the three frames corresponding respectively to red, green and blue. The further television monitor 36 can be selectively connected by way of the switch 37 to the output of the digital VTR 31 or to the output of the digital-to-analog converter 34, or alternatively of course two separate television monitors can be provided.

The characteristics of the apparatus are such that it produces sharp, clear pictures with good motion portrayal on the film, and in particular it produces pictures without motion blur and without introducing any additional judder components. Moreover, the separated operation permitted by the recording of the motion compensated progressive scan digital video signal on the digital VTR 14, in turn permits easy and frequent checking of the parameters of the apparatus, to ensure the quality of the pictures obtained on the film. Iterative operation is perfectly possible, so that the results can rapidly be evaluated and conversion repeated with any flaws corrected by adjustment of the parameters. To obtain higher speed operation, it is of course possible for the first part of the apparatus, that is the part shown in FIG. 2 to be replicated a number of times, to provide additional inputs to the digital VTR 31, so permitting a more intensive use of the part of the apparatus shown in FIG. 3, and hence a higher overall conversion speed.

Figure 4:
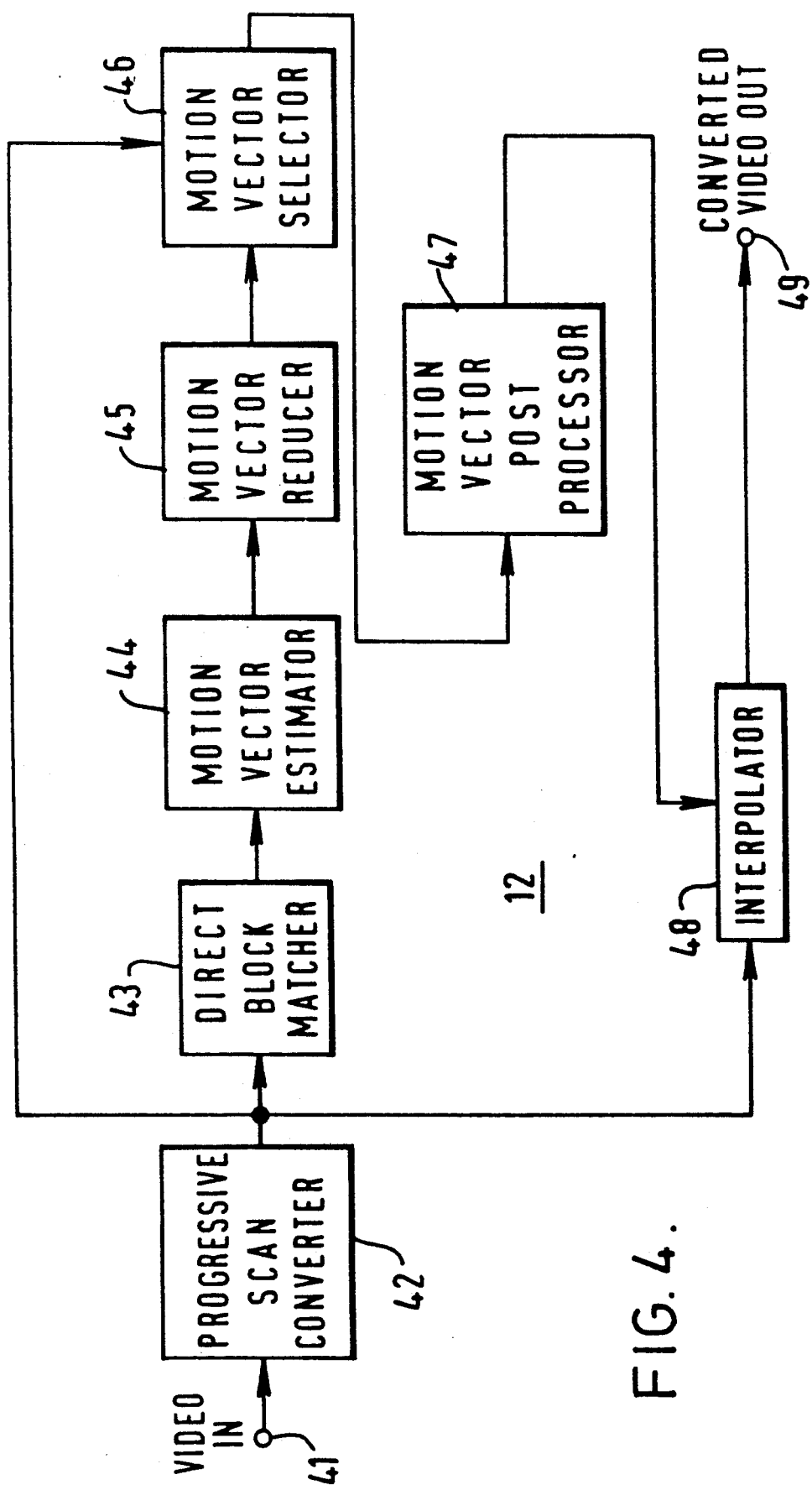
FIG. 4 is a more detailed block diagram of part of the embodiment.

FIG. 4 is a block diagram of the standards converter 12 which will now be described in more detail. The standards converter 12 comprises an input terminal 41 to which an input video signal is supplied. The input terminal is connected to a progressive scan converter 42 in which the input video fields are converted into video frames which are supplied to a direct block matcher 43 wherein correlation surfaces are created. These correlation surfaces are analysed by a motion vector estimator 44, which derives and supplies motion vectors to a motion vector reducer 45, wherein the number of motion vectors for each pixel is reduced, before they are supplied to a motion vector selector 46, which also receives an output from the progressive scan converter 42. Any irregularity in the selection of the motion vectors by the motion vector selector 46 is removed by a motion vector post processor 47, from which the processed motion vectors are supplied to and control an interpolator 48 which also receives an input from the progressive scan converter 42. The output of the interpolator 48, which is a standards-converted and motion-compensated video signal is supplied to an output terminal 49. Each part of the standards converter 12 and the operation thereof will be described in more detail below.

Figure 5:
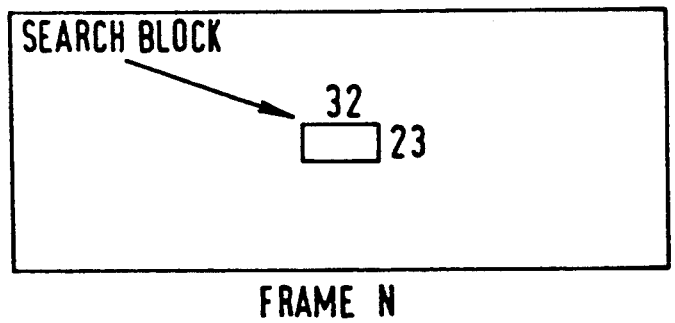
FIG. 5 shows diagrammatically progressive scan conversion.

The progressive scan converter 42 produces output frames at the same rate as the input fields. Thus, referring to FIG. 5 which shows a sequence of consecutive lines in a sequence of consecutive fields, the crosses representing lines present in the input fields and the squares representing interpolated lines, each output frame will contain twice the number of lines as an input field, the lines alternating between lines from the input video signal and lines which have been interpolated by one of the methods to be described below. The interpolated lines can be regarded as an interpolated field of the opposite polarity to the input field, but in the same temporal position. Progressive scan conversion is carried out for two main reasons; firstly, to make the following direct block matching process easier, and secondly in consideration of the final output video format.

Concerning direct block matching, this is used to obtain an accurate estimation of the horizontal and vertical motion between two successive video fields, as described in more detail below. However, it can be shown that if processive scan conversion is not first effected, problems will arise due to the interlaced structure of the video signal on which direct block matching is performed.

Concerning consideration of the final output video format, in the case of the present embodiment, the converted video is supplied via tape to an electron beam recorder, and needs to consist of frames corresponding to the motion picture film rate of 24 frames per second. For this reason, therefore, the production of progressive scan converted frames is necessary, and moreover the progressive scan converted frames can also be used as a fall-back in the case where motion compensated standards conversion is deemed to be producing unacceptable results, for example, where the motion is too diverse to be analysed satisfactiorily or at a scene change or other scene discontinuity. In that case the use of the nearest progressive scan converted frame as the required output frame can produce reasonably acceptable results.

Figure 6:
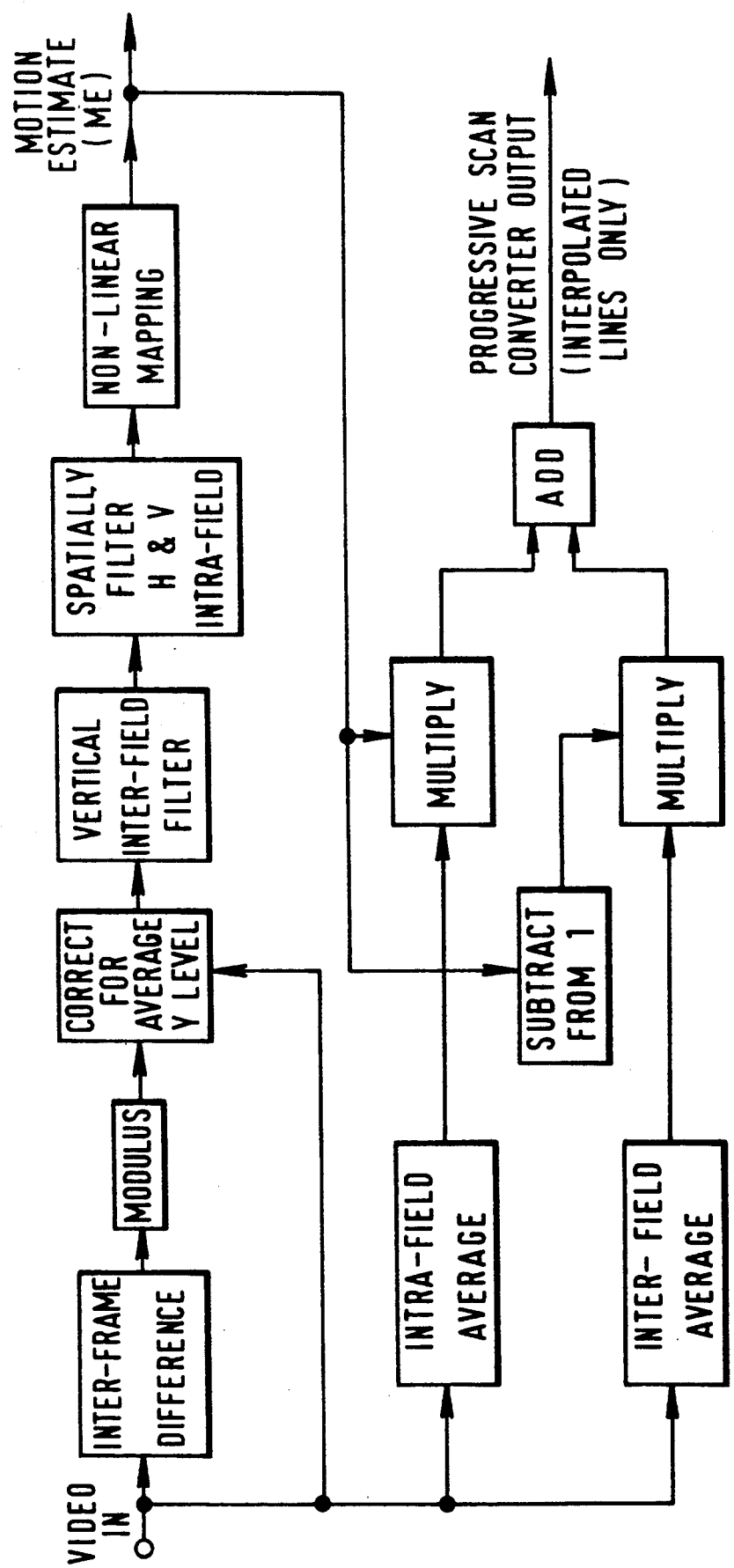
FIG. 6 is a block diagram showing the steps in motion adaptive progressive scan conversion.

Progressive scan conversion can be carried out in a number of ways, such as by previous field replacement, median filtering in which three spatially consecutive lines are examined (temporally these three lines will come from two consecutive fields), or a motion compensated technique which utilizes multi-gradient motion detection followed by multi-direction linear interpolation. However, in the present embodiment the preferred method is motion adaptive progressive scan conversion, the steps of which are indicated in the block diagram of FIG. 6. The concept is to use inter-field interpolation in wholly static picture areas to retain as much vertical information as possible, and to use intra-field interpolation when significant motion is present. This also aids smooth portrayal of motion. In scenes where the motion is somewhere between these two extremes, an estimate of the local motion present in the picture is made, and this is then used to mix together different proportions of inter- and intra-field interpolation. This is described in more detail in the above-mentioned European patent specification.

Referring back to FIG. 4, the frames of video derived by the progressive scan converter 42 are used to derive motion vectors. The estimation of motion vectors consists of two steps. Firstly, correlation surfaces are generated by correlating search blocks from consecutive frames. Then, having obtained these correlation surfaces, they have to be examined to determine the position or positions at which correlation is best. Several different methods of obtaining a correlation surface exist, the two main methods being phase correlation and direct block matching. There are, however, a number of problems associated with the use of phase correlation, these being very briefly problems relating to the transform mechanism, the windowing function, the block size and the variable quality of the contour of the surface produced. In the present embodiment, therefore, direct block matching is preferred.

The direct block matcher 43 operates as follows. Two blocks, respectively comprising a rectangular array of pixels from consecutive frames of the progressive scan converted video signal are correlated to produce a correlation surface from which a motion vector is derived.

Figure 7:
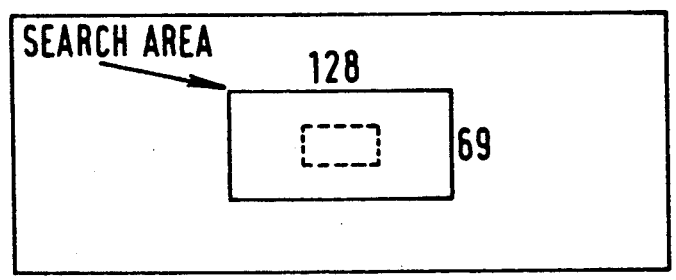

Referring to FIG. 7, firstly a small block called a search block of size 32 pixels by 23 lines is taken from a frame as shown in FIG. 7. Then a larger block called a search area of size 128 pixels by 69 lines is taken from the next frame. The search block (SB) is then placed in each possible position in the search area (SA) as shown in FIG. 8, and for each location the sum of the absolute difference of pixel luminance levels between the two blocks is calculated. This value is then used as the height of the correlation surface at the point at which it was derived. It can then be used in conjunction with other similarly derived values for each possible location of the search block in the search area to obtain a correlation surface, an example of which is shown in FIG. 9. For clarity the surface is shown inverted, and as it is in fact the minimum that is required, the required point in FIG. 9 is the main peak.

The size of the search block is selected by examining the minimum size of an object that may require motion compensation. For PAL 625 lines per frame, 50 fields per second signals a search block of 16 pixels by 8 lines has been found suitable for tracking a small object without allowing any surrounding information not within the object, but still within the search block, to affect the tracking of the object. This approach has therefore been adopted in the present embodiment, but modified to take account of the different numbers of active pixels per line, active lines per frame, and aspect ratio of an HDVS as compared with PAL 625/50. The comparative figures, the HDVS being put first, are as follows; 1920 (720) active pixels per line, 1035 (575) active lines per frame, 3:5.33 (3:4) aspect ratio.

It should be added that there is an argument for using a larger search block, since this means that a large object can be tracked. On the other hand, there exists an argument for using a smaller search block, to prevent a small object being over-shadowed by the effect of a large object or background area. Also, however, there is the advantage that with small search blocks there is no requirement for the derivation of more than one motion vector from each of them. Because having a single motion vector is so much easier than having more than one, the present embodiment starts with a small search block as described above, and then causes the search block to grow into a bigger search block if no satisfactory result has been obtained. This then encompasses the advantages of both a small and a large search block. The criteria for a satisfactory result is set by the motion vector estimator 44 (FIG. 4) referred to in more detail below and which determines the motion vector from a given correlation surface.

This technique of causing the search block to grow is not only advantageous for tracking large objects. It can also be shown to help track the movement of an object having the shape of a regular pattern of a periodic nature.

The search block, and the search area, can both be grown horizontally or vertically, or indeed in both directions, if the correlation surface suggests it.

From the correlation surface (FIG. 9) generated for each search block in a frame the motion vector estimator 44 (FIG. 4) deduces the likely inter-frame motion between the search block and its corresponding search area. It should again be mentioned that for clarity all diagrams of correlation surfaces are shown inverted, that is, such that a minimum is shown as a peak.

The motion vector estimator 44 (FIG. 4) uses motion vector estimation algorithms to detect the minimum point on each correlation surface. This represents the point of maximum correlation between the search block and the search area, and hence indicates the probable motion between them. The displacement of this minimum on the correlation surface with respect to the origin, in this case the centre of the surface, is a direct measurement, in terms of pixels per frame, of the motion. For the simplest case, where the correlation surface contains a single, distinct minimum, the detection of the minimum point on the correlation surface is sufficient to determine accurately the motion between the search block and the search area. As previously mentioned, the use of small search blocks improves the detection of motion and the accuracy of motion estimation, but unfortunately small single search blocks are unable to detect motion in a number of circumstances which will now be described.

Figure 11:
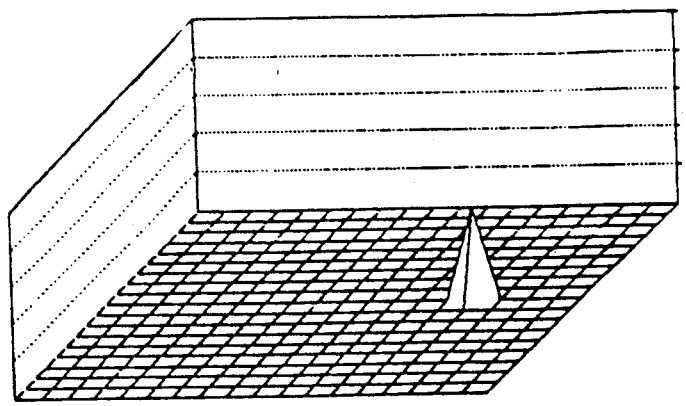
FIGS. 11 to 13 show three resulting correlation surfaces, respectively.
Figure 12:
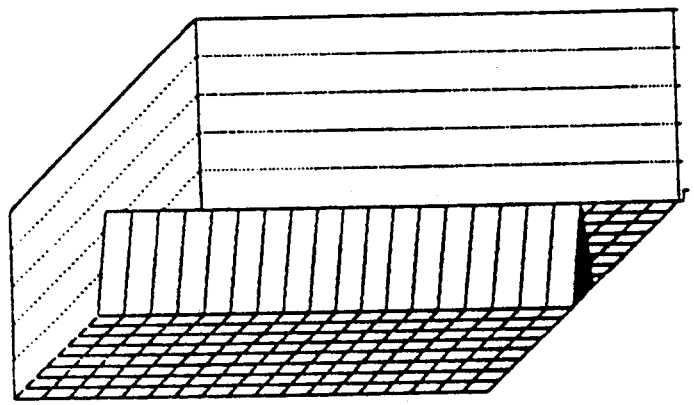

FIG. 10 shows an object with motion vectors (5, 0) straddling three search blocks 1A, 2A and 3A in a frame (t). When the search blocks 1A and 3A are correlated with respective search areas (1B and 3B) in the next frame (t+1) a correlation surface shown in FIG. 11 results showing a minimum at (5, 0). (This assumes a noiseless video source.) However, when the search block 2A is correlated with its respective search area 2B, the correlation surface shown in FIG. 12 is produced, in which the search block 2A correlates with the search area 2B at every point in the y-axis direction. There is therefore no single minimum in the correlation surface, and hence the motion between the search block 2A and the search area 2B cannot be determined.

Figure 13:
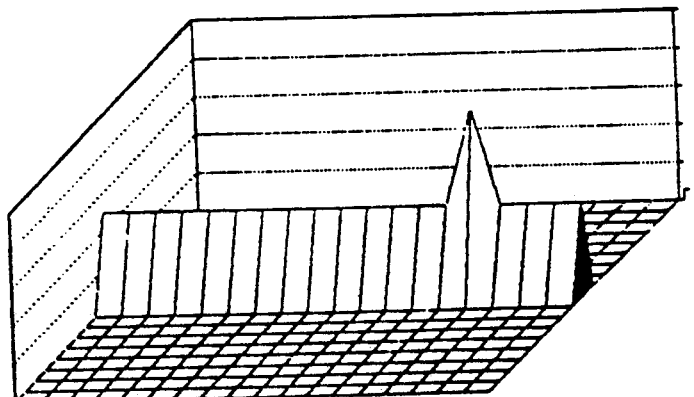

However, now consider the situation if the search block 2A is grown such that it encompasses all three of the original search blocks 1A, 2A and 3A. When the grown search block 2A is correlated with a search area covering the original search areas 1B, 2B and 3B, the resulting correlation surface is as shown in FIG. 13. This shows a single minimum at (5, 0) indicating the correct motion of the original search block 2A. This example illustrates the need for some unique feature in the source video, in order accurately to detect motion. Thus, the search blocks 1A and 3A both had unique vertical and horizontal features, that is the edges of the object, and hence motion could be determined. In contrast, the search block 2A had a unique vertical feature, but no unique horizontal feature, and hence horizontal motion could not be determined. However, by growing the search block until it encompasses a unique feature both horizontally and vertically, the complete motion for that search block can be determined. Moreover, it can be shown that growing the search block is beneficial when noise in the source video is considered.

Figure 14:
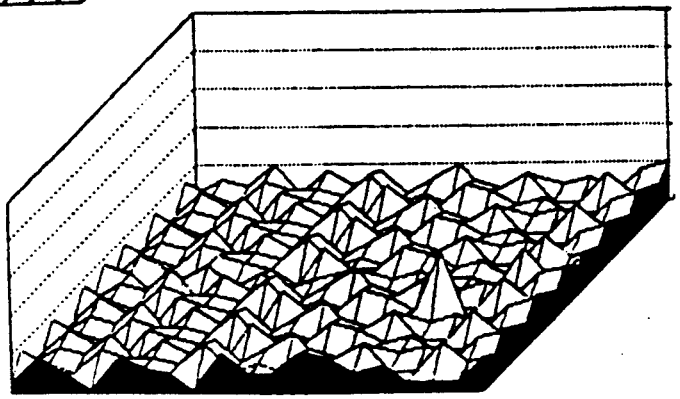
FIGS. 14 and 15 show further examples of correlation surfaces, used in describing a threshold test.
Figure 15:
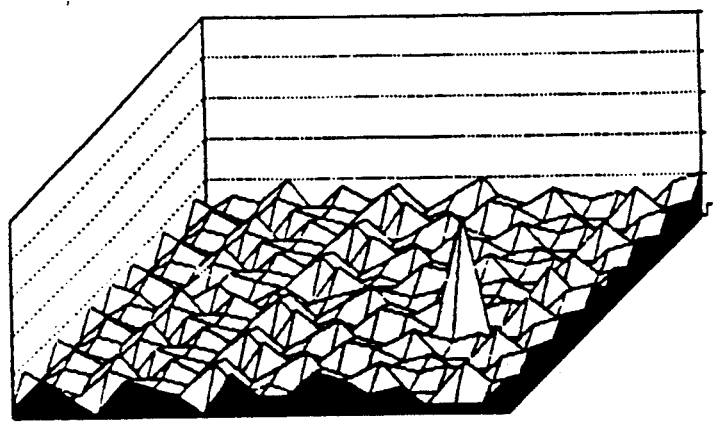

A further example will now be considered with reference to FIG. 14. This shows a correlation surface for a search block where the motion vector is (5, 3). However, due to the numerous other correlations which have taken place between the search block and the search area, the true motion is difficult to detect. An example of source video which might produce such a correlation surface would be a low contrast tree moving with the wind. It is now assumed that the search block and the search area are grown. The growing can take place in the horizontal direction, as in the previous example, or in the vertical direction, or in both directions. Assuming that the neighbouring search blocks have the same motion, the mean effect on the resulting correlation surface will be to increase the magnitude of the minima at (5, 3) by a greater proportion than the magnitude of the other correlation peaks. This is shown in FIG. 15, which indicates that it is then easier to detect the correct motion vector.

The way in which search blocks are grown will now be further considered with reference to FIG. 10. Here it was required to grow the area of the search block 2A to encompass the areas of the search blocks 1A and 3A, and to produce the resulting correlation surface. In fact, the resulting correlation surfaces are produced directly by adding together the elements of the three correlation surfaces corresponding to the search blocks 1A, 2A and 3A. In effect, if each correlation surface is considered as a matrix of point magnitudes, then the correlation surface of the enlarged search block 2A is the matrix addition of the correlation surface of the original search blocks 1A, 2A and 3A.

The area of the search block 2A could also be grown vertically by adding correlation surfaces of the search blocks above and below, whilst if the search block 2A is to be grown both horizontally and vertically, then the four neighbouring diagonal correlation surfaces have to be added as well. From this it will be seen that the actual process of growing a search block to encompass neighbouring search blocks is relatively easy, the more difficult process being to decide when growing should take place, and which neighbouring search blocks should be encompassed. Basically, the answer is that the area of the search blocks should be grown until a good minimum or good motion vector is detected. It is therefore necessary to specify when a motion vector can be taken to be a good motion vector, and this can in fact be deduced from the examples given above.

In the example described with reference to FIGS. 10 to 13, it was necessary to grow the search block horizontally in order to encompass a unique horizontal feature of the object, and hence obtain a single minimum. This situation was characterized by a row of identical minima on the correlation surface of FIG. 12, and a single minimum on the correlation surface of FIG. 13. From this the first criteria for a good minimum can be obtained; a good minimum is the point of smallest magnitude on the correlation surface for which the difference between it and the magnitude of the next smallest point exceeds a given value. This given value is known as the threshold value, and hence this test is referred to herein as the threshold test.

It should be noted that the next smallest point is prevented from originating from within the bounds of a further test, described below, and referred to herein as the rings test. In the case of a rings test employing three rings, the next smallest point in prevented from originating from a point within three pixels of the point in question. In the example of FIGS. 10 to 13, the correlation surface of FIG. 12 would have failed the threshold test; the search area 2A is therefore grown and, given a suitable threshold value, the correlation surface of FIG. 13 will pass the threshold test.

The threshold test can also be used to cause growing in the example described above with reference to FIGS. 14 and 15. Prior to growing the search block, the correct minimum is undetectable, due to the closely similar magnitudes of the surrounding points. Given a suitable threshold value, however, the correlation surface will fail the threshold test, and the search block will be grown. As a result, it will then be possible to detect the minimum among the other spurious points.

It will be seen that the use of a threshold is a subjective test, but the correct threshold for the correlation surface under test can be selected by normalizing the threshold as a fraction of the range of magnitudes within the correlation surface. This also lessens the effect of, for example the contrast of the video source.

Figure 16:
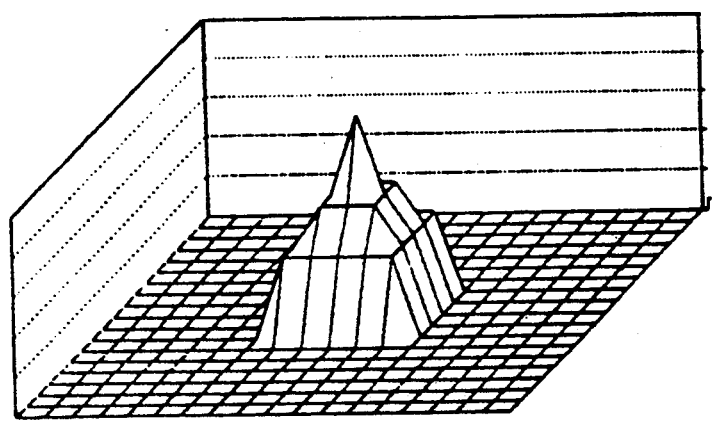
FIGS. 16 and 17 show still further examples of correlation surfaces, used in describing a rings test.
Figure 17:
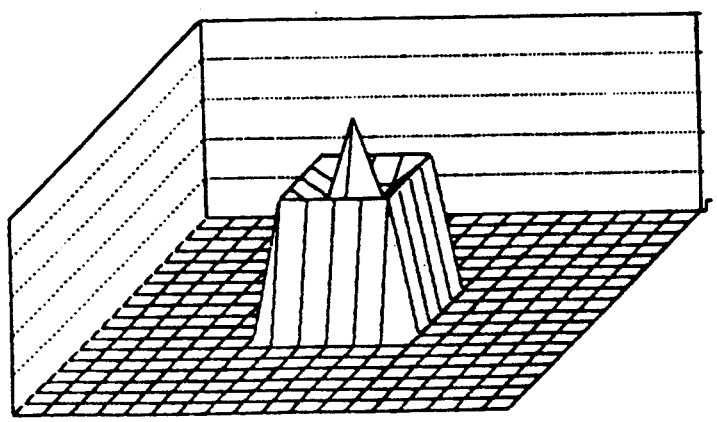

The rings test, referred to briefly above, and which is far less subjective, will now be further described. The basis of the rings test is to assume that a good minimum (or maximum) will have points of increasing (or decreasing) magnitudes surrounding it. FIG. 16 illustrates this assumption, showing a minimum at (0, 0) where the surrounding three rings of points have decreasing mean magnitude. This is as opposed to the correlation surface shown in FIG. 17, where the rings, and in particular the second inner-most ring, are not of decreasing mean magnitude.

In this case the criteria for a good minimum as defined by the rings test, is that the average slope is monotonic. Therefore for a pre-defined number of rings of points surrounding the minimum in question, the mean magnitude of each ring when moving from the inner-most ring outwards, must be greater than that of the previous ring. Returning again to the example described with reference to FIGS. 10 to 13, it will be seen from FIGS. 12 and 13 that the correlation surface of FIG. 12 would have failed the rings test, but that the correlation surface of FIG. 13 would have passed the rings test. Since the rings test compares mean, and not absolute, magnitudes, it is far less subjective than the threshold test, and indeed the only variable in the rings test is the number of rings considered.

Having described the mechanism for growing a search block, it is now necessary to consider how by examining the shape of the correlation surface it is possible to determine the most effective direction in which the search block should grow.

Referring again to FIG. 12, this correlation surface resulted where there was a unique vertical feature, but no unique horizontal feature. This is mirrored in the correlation surface by the minimum running horizontally across the correlation surface, due to the multiple correlations in this direction. From this it can be deduced that the search block should be grown horizontally. Conversely, should a line of multiple correlations run vertically, this would indicate the need to grow the search block vertically, whilst a circular collection of multiple correlations would indicate a need to grow the search block both horizontally and vertically.

Using this criteria, a quantative measure of the shape of the correlation surface is required in order to determine in which direction the search block should be grown. This measure is determined as follows. Firstly, a threshold is determined. Any point on the correlation surface below the threshold is then considered. This threshold, like that used in the threshold test, is normalized as a fraction of the range of magnitudes within the correlation surface. Using this threshold, the points on the correlation surface are examined in turn in four specific sequences. In each, the point at which the correlation surface value falls below the threshold is noted. These four sequences are illustrated diagrammatically in FIG. 18 in which the numbers 1, 2, 3 and 4 at the top, bottom, left and right refer to the four sequences, and the hatched area indicates points which fall below the threshold:

Sequence 1
Search from the top of the correlation surface down for a point A which falls below the threshold.
Sequence 2

Search from the bottom of the correlation surface up for a point C which falls below the threshold.

Sequence 3

Search from the left of the correlation surface to the right for a point D which falls below the threshold.

Sequence 4

Search from the right of the correlation surface to the left for a point B which falls below the threshold.

Figure 18:
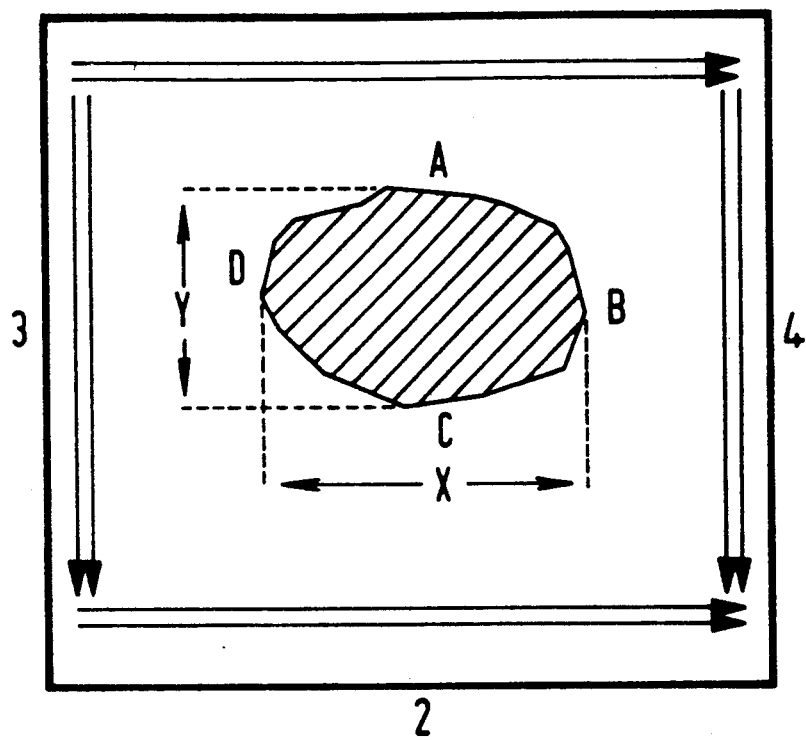
FIG. 18 shows diagrammatically how the direction in which a search block is to grow is determined.

The locations of the four resulting points A, B, C and D are used to calculate the two dimensions X and Y indicated in FIG. 18, these dimensions X and Y indicating the size of the hatched area containing the points falling below the threshold value. Hence from the dimensions X and Y, it can be deduced whether the shape is longer in the x rather than the y direction, or vice versa, or whether the shape is approximately circular. A marginal difference of say ten percent is allowed in deducing the shape, that is, the dimension X must be a minimum of ten percent greater than the dimension Y for the shape to be considered to be longer in the x direction. Similarly for the y direction. If the dimensions X and Y are within ten percent of each other, then the shape is considered to be circular, and the search block is grown in both directions. In the example of FIG. 18 the dimension X is greater than the dimension Y, and hence the search block is grown in the x or horizontal direction.

The growing of the search block continues until one or more growth limitations is reached. These limitations are: that the minimum in the correlation surface passes both the threshold test and the rings test; that the edge of the video frame is reached; or that the search block has already been grown a predetermined number of times horizontally and vertically. This last limitation is hardware dependent. That is to say, it is limited by the amount of processing that can be done in the available time. In one specific embodiment of apparatus according to the present invention, this limit was set at twice horizontally and once vertically.

If the minimum in the correlation surface passes both the threshold test and the rings test, then it is assumed that a good motion vector has been determined, and can be passed to the motion vector reducer 45 (FIG. 4). However, if the edge of the frame is reached or the search block has already been grown a predetermined number of times both horizontally and vertically, then it is assumed that a good motion vector has not been determined for that particular search block, and instead of attempting to determine a good motion vector, the best available motion vector is determined by weighting.

The correlation surface is weighted such that the selection of the best available motion vector is weighted towards the stationary, that is the centre, motion vector. This is for two reasons, firstly, if the search block, even after growing, is part of a large plain area of source video, it will not be possible to detect a good motion vector. However, since the source video is of a plain area, a stationary motion vector will lead to the correct results in the subsequent processing. Secondly, weighting is designed to reduce the possibility of a seriously wrong motion vector being passed to the motion vector reducer 45 (FIG. 4). This is done because it is assumed that when a good motion vector cannot be determined, a small incorrect motion vector is preferable to a large incorrect motion vector.

Figure 19:
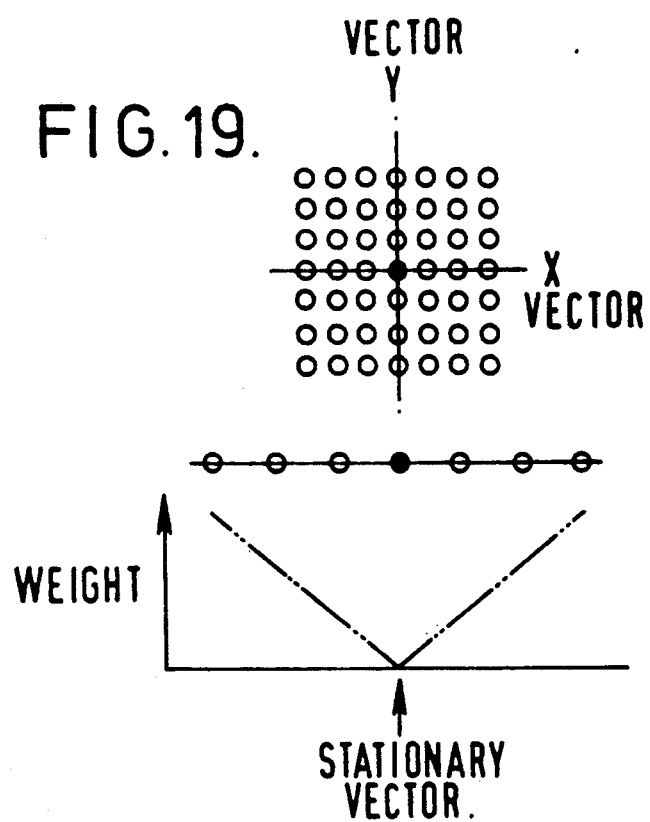
FIG. 19 shows diagrammatically how a correlation surface is weighted.

FIG. 19 shows an example of how the weighting function can be applied to the correlation surface. In this example, the weight applied to a given point on the correlation surface is directly proportional to the distance of that point from the stationary, centre motion vector. The magnitude of the point on the correlation surface is multiplied by the weighting factor. For example, the gradient of the weighting function may be such that points plus or minus 32 pixels from the centre, stationary motion vector are multiplied by a factor of three. In other words, as shown in FIG. 19, where the centre, stationary motion vector is indicated by the black circle, the weighting function is an inverted cone which is centred on the centre, stationary motion vector.

After the correlation surface has been weighted, it is again passed through the threshold test and the rings test. If a minimum which passes both these tests is determined, then it is assumed that this is a good motion vector, and it is flagged to indicate that it is a good motion vector, but that weighting was used. This flag is passed, together with the motion vector to the motion vector reducer 45 (FIG. 4). If on the other hand, neither a good motion vector nor a best available motion vector can be determined, even after weighting, then a flag is set to indicate that any motion vector passed to the motion vector reducer 45 (FIG. 4) for this search block is a bad motion vector. It is necessary to do this because bad motion vectors must not be used in the motion vector reduction process, but must be substituted as will be described below.

Thus, in summary, the operation of the motion vector estimator 44 (FIG. 4) is to derive from the correlation surface generated by the direct block matcher 43 (FIG. 4), the point of best correlation, that is the minimum. This minimum is then subjected to the threshold test and the rings test, both of which the minimum must pass in order for it to be considered to represent the motion of the search block. It should, incidentally, be noted that the threshold used in the threshold test and the rings test may be either absolute values or fractional values. If the minimum fails either test, then the search block is grown, a new minimum is determined, and the threshold test and the rings test re-applied. The most effective direction in which to grow the search block is determined from the shape of the correlation surface.

Referring initially to FIG. 4, the process of motion vector reduction will now be described. Using an HDVS, each search block is assumed to be 32 pixels by 23 lines, which can be shown to lead to a possible maximum of 2451 motion vectors. The choice of the search block size is a compromise between maintaining resolution and avoiding an excessive amount of hardware. If all these motion vectors were passed to the motion vector selector 46, the task of motion vector selection would not be practicable, due to the amount of processing that would be required. To overcome this problem, the motion vector reducer 45 is provided between the motion vector estimator 44 and the motion vector selector 46. The motion vector reducer 45 takes the motion vectors that have been generated by the motion vector estimator 44 and presents the motion vector selector 46 with only, for example, four motion vectors for each search block in the frame, including those in border regions, rather than all the motion vectors derived for that frame. The effect of this is two-fold. Firstly, this makes it much easier to choose the correct motion vector, so long as it is within the group of four motion vectors passed to the motion vector selector 46. Secondly, however, it also means that if the correct motion vector is not passed as one of the four, then the motion vector selector 46 is not able to select the correct one. It is therefore necessary to try to ensure that the motion vector reducer 45 includes the correct motion vector amongst those passed to the motion vector selector 46. It should also be mentioned that although four motion vectors are passed by the motion vector reducer 45 to the motion vector selector 46, only three of these actually represent motion, the fourth motion vector always being the stationary motion vector which is included to ensure that the motion vector selector 46 is not forced into applying a motion vector representing motion to a stationary pixel. Other numbers of motion vectors can be passed to the motion vector selector 46, for example, in an alternative embodiment four motion vectors representing motion and the stationary motion vector may be passed.

Hereinafter the term 'sample block' refers to a block in a frame of video in which each pixel is offered the same four motion vectors by the motion vector reducer 45. Thus, a sample block is the same as a search block before the search block has been grown, and in a frame of video the initial positions of the sample blocks and the search blocks are the same.

The motion vector reducer 45 (FIG. 4) receives the motion vectors and the flags from the motion vector estimator 44 (FIG. 4) and determines the quality of the motion vectors by examining the flags. If the motion vector was not derived from an ambiguous surface, that is there is a high degree of confidence in it, then it is termed a good motion vector, but if a certain amount of ambiguity exists, then the motion vector is termed a bad motion vector. In the motion vector reduction process, all motion vectors classed as bad motion vectors are ignored, because it is important that no incorrect motion vectors are ever passed to the motion vector selector 46 (FIG. 4), in case a bad motion vector is selected thereby. Such selection would generally result in a spurious dot in the final picture, which would be highly visible.

Each of the motion vectors supplied to the motion vector reducer 45 (FIG. 4) was obtained from a particular search block, and hence a particular sample block, the position of these being noted together with the motion vector. Because any motion vectors which have been classed as bad motion vectors are ignored, not all sample blocks will have a motion vector derived from the search block at that position. The motion vectors which have been classed as good motion vectors, and which relate to a particular search block, and hence a particular sample block, are called local motion vectors, because they have been derived in the area from which the sample block was obtained. In addition to this, another motion vector reduction process counts the frequency at which each good motion vector occurs, with no account taken of the actual positions of the search blocks that were used to derive them. These motion vectors are then ranked in order of decreasing frequency, and are called common motion vectors. In the worst case only three common motion vectors are available and these are combined with the stationary motion vector to make up the four motion vectors to be passed to the motion vector selector 46 (FIG. 4). However, as there are often more than three common motion vectors, the number has to be reduced to form a reduced set of common motion vectors referred to as global motion vectors.

A simple way of reducing the number of common motion vectors is to use the three most frequent common motion vectors and disregard the remainder. However, the three most frequent common motion vectors are often those three motion vectors which were initially within plus or minus one pixel motion of each other vertically and/or horizontally. In other words, these common motion vectors were all tracking the same motion with slight differences between them, and the other common motion vectors, which would have been disregarded, were actually tracking different motions.

In order to select the common motion vectors which represent all or most of the motion in a scene, it is necessary to avoid choosing global motion vectors which represent the same motion. Thus, the strategy actually adopted is first to take the three most frequently occurring common motion vectors and check to see if the least frequent among them is within plus or minus one pixel motion vertically and/or plus or minus one pixel motion horizontally of either of the other two common motion vectors. If it is, then it is rejected, and the next most frequently occuring common motion vector is chosen to replace it. This process is continued for all of the most frequently occurring common motion vectors until there are either three common motion vectors which are not similar to each other, or until there are three or less common motion vectors left. However, if there are more than three common motion vectors left, then the process is repeated this time checking to see if the least frequent among them is within plus or minus two pixel motion vertically and/or plus or minus two pixel motion horizontally of another, and so on at increasing distances if necessary. These three common motion vectors are the required global motion vectors, and it is important to note that they are still ranked in order of frequency.

When considering the motion vector reduction process and the sample blocks of a frame of video, it is necessary to look at three different types of sample blocks. These types are related to their actual position in a frame of video, and are shown in FIG. 20 as regions. Region A comprises sample blocks which are totally surrounded by other sample blocks and are not near the picture boundary. Region B contains sample blocks which are partially surrounded by other sample blocks and are not near the picture boundary. Finally, region C contains sample blocks which are near the picture boundary. The motion vector reduction algorithm to be used for each of these regions is different. These algorithms will be described below, but firstly it should be reiterated that there exist good motion vectors for some of the sample blocks in the frame of video, and additionally there are also three global motion vectors which should represent most of the predominant motion in the scene. A selection of these motion vectors is used to pass on three motion vectors together with the stationary motion vector for each sample block.

FIG. 21 illustrates diagrammatically motion vector reduction in the region A. This is the most complex region to deal with, because it has the largest number of motion vectors to check. FIG. 21 shows a central sample block which is hatched, surrounded by other sample blocks a to h. Firstly, the locally derived motion vector is examined to see if it was classed as a good motion vector. If it was, and it is also not the same as the stationary motion vector, then it is passed on. However, if it fails either of these tests, it is ignored. Then the motion vector associated with the sample block d is checked to see if it was classed as a good motion vector.

If it was, and if it is neither the same as any motion vector already selected, nor the same as the stationary motion vector, then it too is passed on. If it fails any of these tests then it too is ignored. This process then continues in a similar manner in the order e, b, g, a, h, c and f. As soon as three motion vectors, not including the stationary motion vector, have been obtained, then the algorithm stops, because that is all that is required for motion vector selection for that sample block. It is, however, possible for all the above checks to be carried out without three good motion vectors having been obtained. If this is the case, then the remaining spaces are filled with the global motion vectors, with priority being given to the more frequent global motion vectors.

Figure 22:
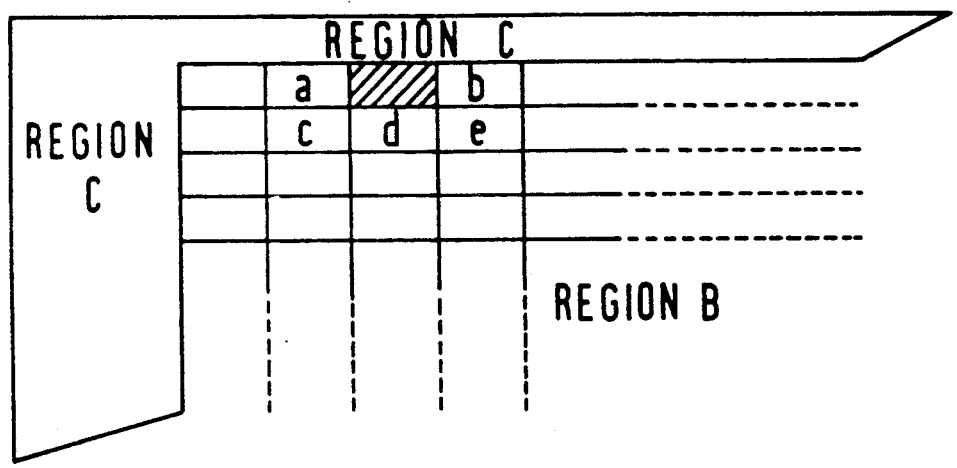

FIG. 22 illustrates motion vector reduction in the region B. Sample blocks in the region B are the same as those in the region A, except that they are not totally surrounded by other sample blocks. Thus the process applied to these sample blocks is exactly the same as those for the region A, except that it is not possible to search in all the surrounding sample blocks. Thus as seen in FIG. 22, it is only possible to check the motion vectors for the sample blocks a to e, and any remaining spaces for motion vectors are filled, as before, with global motion vectors. Likewise, if the hatched sample block in FIG. 22 were displaced two positions to the left, then it will be seen that there would only be three adjacent surrounding blocks to be checked before resorting to global motion vectors.

Figure 23:
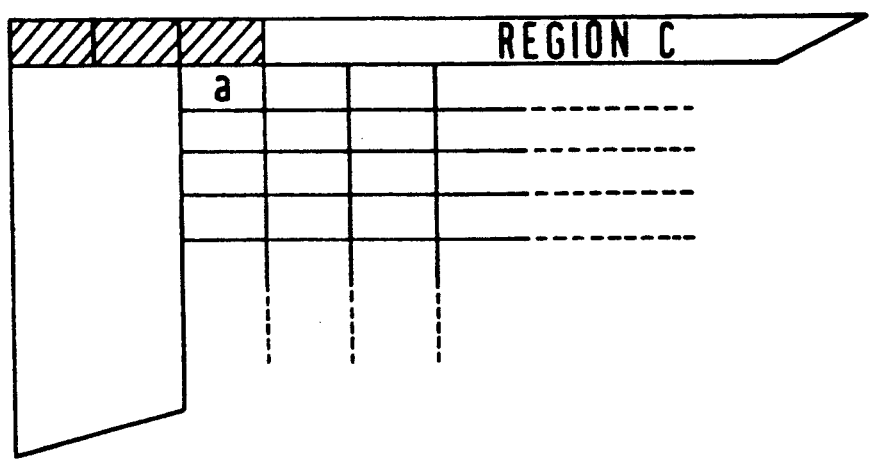

FIG. 23 illustrates motion vector reduction in the region C. This is the most severe case, because the sample blocks neither have a locally derived motion vector nor do they have many surrounding sample blocks whose motion vectors could be used. The simplest way of dealing with this problem is simply to give the sample blocks in the region C the global motion vectors together with the stationary motion vector. However, this is found to produce a block-like effect in the resulting picture, due to the sudden change in the motion vectors presented for the sample blocks in the region C compared with adjoining sample blocks in the region B. Therefore a preferred strategy is to use for the sample blocks in the region C the sample motion vectors as those used for sample blocks in the region B, as this prevents sudden changes. Preferably, each sample block in the region C is assigned the same motion vectors as that sample block in the region B which is physically nearest to it. Thus, in the example of FIG. 23, each of the hatched sample blocks in the region C would be assigned the same motion vectors as the sample block a in the region B, and this has been found to give excellent results.

Referring again to FIG. 4, the purpose of the motion vector selector 46 is to assign one of the four motion vectors supplied thereto to each individual pixel within the sample block. In this way the motion vectors can be correctly mapped to the outline of objects. The way in which this assignment is effected is particularly intended to avoid the possibility of the background surrounding fine detail from producing a better match than that produced by the correct motion vector. To achieve this the motion vector selection process is split into two main stages. In the first stage, motion vectors are produced for each pixel in the input frames. In other words, there is no attempt to determine the motion vector values for pixels at the output frame positions. The second stage uses the motion vector values produced by the first stage to determine the motion vector value for each pixel in the output frame.

Figure 24:
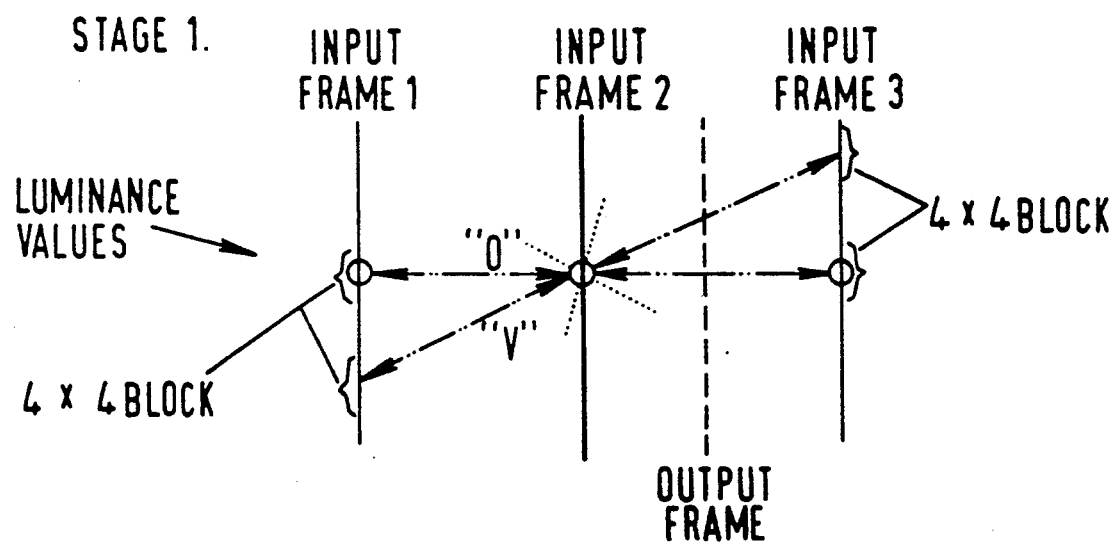
FIGS. 24 and 25 show diagrammatically a first stage in motion vector selection.

Referring now to FIG. 24, each pixel of the input frame 2 is tested for the best luminance value match with the previous and following input frames 1 and 3 of video data, using each of the four motion vectors supplied. The pixel luminance difference is determined as:

$$\sum_{m=0}^{4} \sum_{n=0}^{4} |P1_{nm} - P2_{nm}| + \sum_{m=0}^{4} \sum_{n=0}^{4} |P2_{nm} - P3_{nm}|$$

where:
- $P1_{nm}$ is the luminance value of a frame 1 pixel within a 4×4 block of pixels surrounding the pixel whose location is obtained by subtracting the coordinates of the motion vector being tested from the location of the pixel being tested in frame 2
- $P2_{nm}$ is the luminance value of a frame 2 pixel within a 4×4 block of pixels surrounding the pixel being tested
- $P3_{nm}$ is the luminance value of a frame 3 pixel within a 4×4 block of pixels surrounding the pixel whose location is obtained by adding the coordinates of the motion vector being tested to the location of the pixel being tested in frame 2.

The minimum pixel difference then indicates the best luminance match and therefore the correct motion vector applicable to the pixel being tested. If the correct motion vector is not available, or there are uncovered or covered areas or a scene discontinuity, referred to in more detail below, then a good match may not occur.

The indication of a poor match is achieved when the average pixel difference within the block of pixels being used is above a certain threshold. This threshold is important, because high frequency detail may produce a poor match even when the correct motion vector is tested. The reason for this poor match is the possibility of a half pixel error in the motion vector estimate. To determine what threshold should indicate a poor match, it is necessary to relate the threshold to the frequency content of the picture within the block of data which surrounds the pixel for which the motion vector is required. To achieve this, an auto-threshold value is determined where the threshold value equals half the maximum horizontal or vertical pixel luminance difference about the pixel being tested. To ensure that the threshold value obtained is representative of the whole block of data which is compared, an average value is obtained for the four central pixels of a 4×4 block used.

Figure 25:
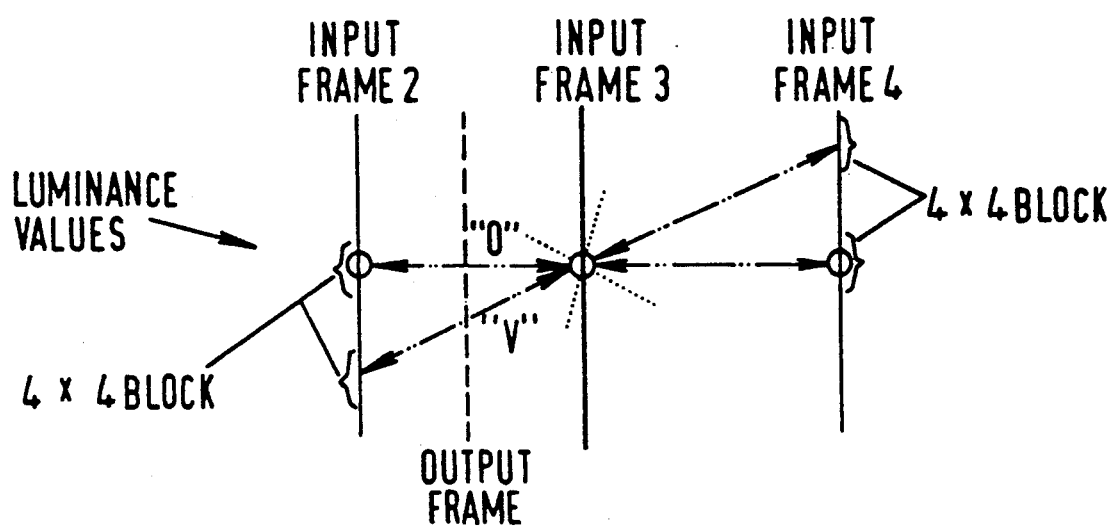

Referring to FIG. 26, which shows a 4×4 block, the required threshold value T is given by:

$$T = (T1 + T2 + T3 + T4)/8$$

where T3, for example, is determined as indicated in FIG. 27 as equal to the maximum of the four pixel luminance difference values comprising:
- the two vertical differences $|B2-B3|$ and $|B4-B3|$, and
- the two horizontal differences $|A3-B3|$ and $|C3-B3|$ In this way a frame of motion vectors is obtained for input frame 2, and in a similar manner a frame of motion vectors is obtained for input frame 3 as indicated in FIG. 25.

At a scene change, a mis-match occurs in the above first stage of motion vector selection. A similar effect occurs at cuts generally, and at wipes, fades and other effects which cause an abrupt change in at least a substantial part of the image. Such an event is referred to throughout this specification as a 'scene discontinuity'.

Whilst a scene discontinuity will be detected by the circuitry described above, which may indeed flag the video signal to indicate an apparent scene discontinuity, this detection cannot be done reliably without undesirable increase in the complexity of the circuitry.

In this embodiment, therefore, information about scene discontinuities is derived from the edit list. It is generally the case that an edit list is already available, or if it is not it can readily be prepared, on an IBM PC industry standard floppy disc. Thus, where the material has been prerecorded and edited together, the edit list can be prepared automatically by the editor equipment, and transmitted with the material. If live material is used, then some form of hardware scene change detection circuitry can be provided at the transmission end.

In written form for the use of a producer or an editor, the edit list may be as indicated in FIG. 28 and comprise columns listing the sequential number of the scene, a brief indication in words of the scene content, and the time code at each scene change, or more generally each scene discontinuity. As recorded on a floppy disc for use in the embodiment, the edit list may be a sequential list of the time code at each scene discontinuity, or more preferably a continuous sequence of time codes with the scene discontinuities indicated within the time codes at the corresponding frames. Thus if, for example, the time codes used are the standard EBU or SMPTE time codes, then a predetermined one of the user or ancillary bits can change in value at each scene discontinuity.

Referring to FIG. 2, the floppy disc on which the edit list is recorded is loaded into the disc reader 21 connected to the system controller 15. In operation, time codes are read by the disc reader 21 from the recorded edit list and supplied to the system controller 15, which also receives time codes read from the video tape by the VTR 11. Comparison of the time codes by the system controller 15 enables scene discontinuities in the video signal supplied to the standards converter 12 to be identified, whereupon the system controller 15 supplies a signal to the standards converter 12 to indicate that the motion vectors which have been derived for at least the frame following the scene discontinuity are not reliable, and that the interpolation should change from being based on inter-frame information to being based on intra-frame information. The intra-frame information may be used just for the frame following the scene discontinuity, for a predetermined number of frames following the scene discontinuity.

Apart from scene changes, it is the phenomenon of uncovered/covered surfaces that causes a mis-match to occur in the above first stage of motion vector selection. If an object, say a car, drives into a tunnel, then the car has become covered, while when it drives out, the car is uncovered. If the part of the car that was uncovered in frames 1 and 2 is covered in frames 3 and 4, then the basic vector selection process is not able to determine the correct vector. Moreover, whilst the car going into the tunnel becomes covered, the road and objects behind the car are being uncovered. Likewise the car leaving the tunnel is being uncovered, but the road and objects behind the car are being covered. In general therefore both covered and uncovered objects will exist at the same time. This is somewhat similar in effect to a scene discontinuity. In an attempt to determine a motion vector even in such circumstances, the luminance value block match is reduced to a two frame match, instead of the three frame match of FIGS. 24 and 25. The frame that the motion vectors are required for (say frame 2) is block-matched individually to the previous and the next frame (frame 1 and frame 3 respectively, in the case of frame 2), using the four motion vectors supplied. The motion vector which produces the best match is chosen as the motion vector applicable to the pixel being tested. In this case, however, a flag is set to indicate that only a two frame match was used.

Particularly with integrating type television cameras, there will be situations where no match occurs. If an object moves over a detailed background, then an integrating camera will produce unique portions of picture where the leading and trailing edges of the object are mixed with the detail of the background. In such circumstances, even the two frame match could produce an average pixel difference above the threshold value. In these cases the motion vector value is set to zero, and an error flag is also set.

Figure 29:
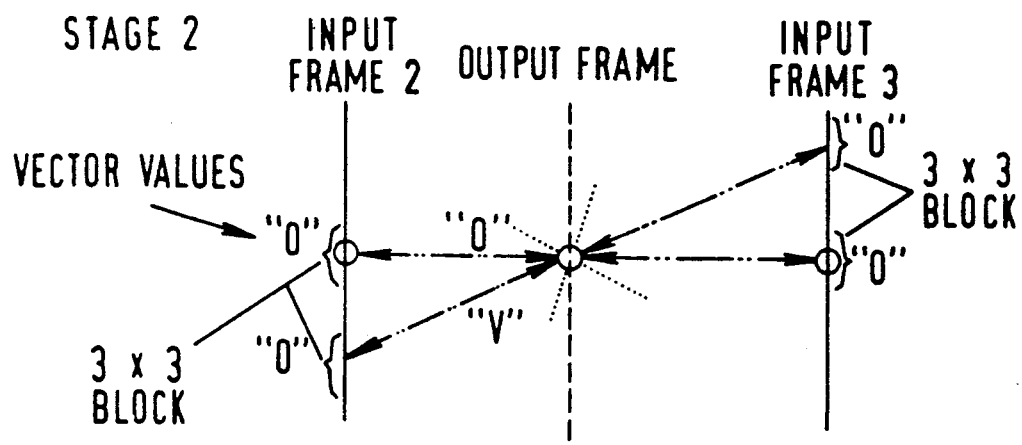
FIG. 29 shows diagrammatically a second stage in motion vector selection.

The second stage of motion vector selection makes use of the two frames of motion vectors, derived by the first stage. One frame of motion vectors (input frame 2) is considered to be the reference frame, and the following frame to this (input frame 3) is also used. The output frame position then exists somewhere between these two frames of motion vectors. Referring to FIG. 29, for each output pixel position the four possible motion vectors associated with the sample block of input frame 2, are tested. A line drawn through the output pixel position at the angle of the motion vector being tested will point to a position on both the input frame 2 and the input frame 3. In the case of odd value motion vectors, for example, 1, 3 and 5, a point midway between two input frame pixels would be indicated in the case where the output frame is precisely half way between the input frames 1 and 2. To allow for this inaccuracy, and also to reduce the sensitivity to individual pixels, a $3 \times 3$ block of motion vectors is acquired for each frame, centred on the closest pixel position. In effect a block-match is then performed between each of the two $3 \times 3$ blocks of motion vectors and a block containing the motion vector being tested. The motion vector difference used represents the spatial difference of the two motion vector values as given by:

$$\sqrt{((x1 - x2)^2 + (y1 - y2)^2)}$$

where:
x1 and y1 are the Cartesian coordinates of the motion vector in one of the blocks
x2 and y2 are the Cartesian coordinates of the motion vector being tested.

An average vector difference per pixel is produced as a result of the block match.

A motion vector match is first produced as above using only motion vector values which were calculated using three input frames; that is, input frames 1, 2 and 3 for input frame 2 (FIG. 24), and input frames 2, 3 and 4 for input frame 3 (FIG. 25), and the result is scaled accordingly. Preferably there are at least four usable motion vectors in the block of nine. When both the motion vector block of frame 2 and frame 3 can be used, the motion vector difference values are made up of half the motion vector difference value from frame 2 plus half the motion vector difference value from frame 3.

Whichever motion vector produces the minimum motion vector difference value using the above technique is considered to be the motion vector applicable to the output pixel being tested. If the motion vector difference value produced by the three frame match input motion vector (FIGS. 24 and 25 is greater than unity, then a covered or uncovered surface has been detected, and the same process is repeated, but this time ignoring the error flags. That is, the motion vector values which were calculated using two input frames are used. Theoretically this is only necessary for uncovered/covered surfaces, although in fact improvements can be obtained to the picture in more general areas.

If after both of the above tests have been performed, the minimum motion vector match is greater than two, the motion vector value is set to zero, and an error flag is set for use by the motion vector post processor 47 (FIG. 4).

Following motion vector selection, there will almost certainly be in any real picture situation, some remaining spurious motion vectors associated with certain pixels. Such spurious motion vectors are assumed to exist at a point singularity, where a single pixel has a motion vector different from those of all the surrounding pixels; at a horizontal motion vector impulse, where three horizontally aligned pixels have a motion vector different from those of the surrounding pixels; at a vertical motion vector impulse where three vertically aligned pixels have a motion vector different from those of the surrounding pixels; at a diagonal motion vector impulse where three diagonally aligned pixels have a motion vector different from those of all the surrounding pixels; at a horizontal plus vertical motion vector impulse, where five pixels disposed in an upright cross have a motion vector different from those of all the surrounding pixels; and at a two-diagonal motion vector impulse where five pixels arranged in a diagonal cross have a motion vector different from those of all the surrounding pixels.

It is assumed that pixel motion vectors which fall into any of the above six categories do not actually belong to a real picture, and are a direct result in of an incorrect motion vector selection. If such motion vectors were used during the interpolation process, then they would be likely to cause dots on the final output picture, and it is therefore preferable that such motion vectors be identified and eliminated. This is done using an algorithm which will detect and flag all of the above motion vector groupings.

Having identified the bad motion vectors, it is then necessary to repair them, this also being effected by the motion vector post processor 47 (FIG. 4). Although various methods such as interpolation or majority replacement can be used, it is has been found that in practice simple replacement gives good results.

Figure 30:
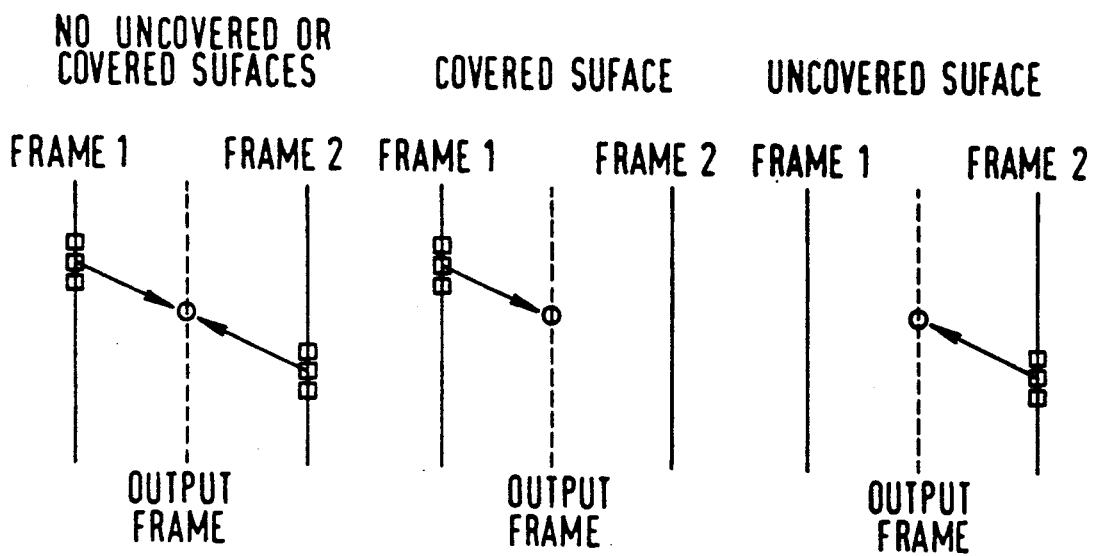
FIG. 30 shows diagrammatically the operation of an interpolator.

Referring again to FIG. 4, the finally selected motion vector for each pixel is supplied by the motion vector post processor 47 to the interpolator 48, together with the progressive scan converted frames at 60 frames per second from the progressive scan converter 42. The interpolator 48 is of relatively simple form using only two progressive scan converted frames, as indicated in FIG. 30. Using the temporal position of the output frame relative to successive input frames, frame 1 and frame 2, and the motion vector for the pixel in the output frame, the interpolator 48 determines in known manner which part of the first frame should be combined with which part of the second frame and with what weighting to produce the correct output pixel value. In other words, the interpolator 48 adaptively interpolates along the direction of movement in dependence on the motion vectors to produce motion compensated progressive scan frames corresponding to 24 frames per second. Although the motion vectors have been derived using only luminance values of the pixels, the same motion vectors are used for deriving the required output pixel chrominance values. An 8×8 array of pixels are used from each frame to produce the required output. Thus the interpolator 48 is a two-dimensional, vertical/horizontal, interpolator and the coefficients used for the interpolator 48 may be derived using the Remez exchange algorithm which can be found fully explained in 'Theory and application of digital signal processing', Lawrence R. Rabiner, Bernard Gold. Prentice-Hall Inc., pages 136 to 140 and 227.

FIG. 30 shows diagrammatically the interpolation performed by the interpolator 48 (FIG. 4) for three different cases. The first case, shown on the left, is where there are no uncovered or covered surfaces, the second case, shown in the centre, is where there is a covered surface, and the third case, shown on the right, is where there is an uncovered surface. In the case of a covered surface, the interpolation uses only frame 1, whilst in the case of an uncovered surface, the interpolation uses only frame 2.

Provision can be made in the interpolator 48 to default to non-motion compensated interpolation, in which case the temporally nearest progressive scan converted frame is used.

Although the method and apparatus described for using scene discontinuity information to cause interpolation to change from being based on inter-frame information to infra-frame information in a television standards converter, the invention has of course much wider application. For example, the change may be from inter-field to intra-field information. The invention can also be applied to other forms of video signal processing apparatus such as down converters, for example the SONY HDN-2000 NTSC down converter which drops fields at a scene changes. Likewise the invention can be applied to motion adaptive and motion compensated transmission standards such as HD-MAC where motion compensation and digital assistance are the strategies for the data rate reduction technique used. In this case the scene discontinuity information can be used to control processing in the encoder and the decoder.

Attention is drawn to the fact that the above-mentioned U.S. Patent is one of a series of fourteen U.S. Patents bearing the numbers U.S. Pat. Nos. 4,998,168; 5,012,337; 5,005,078; 5,012,336; 5,027,205; 5,025,495; 5,016,102; 5,021,881; 5,005,077; 4,992,870; 5,036,393; 4,992,869; 5,027,203 and 5,016,101, and the disclosure in each is incorporated by this reference into the present application.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of converting a video information signal having a first standard format and representing a plurality of scenes having at least one scene discontinuity therebetween to at least one of a motion adaptive video signal and a motion compensated video signal having a second standard format, said method comprising the steps of:

reproducing information stored on a recording medium relating to each said scene discontinuity and comparing the reproduced information to scene information contained in said video information signal so as to identify each said scene discontinuity in said video information signal; and converting the format of said video information signal at locations other than each identified scene discontinuity on the basis of information obtained from said video information signal on one of an inter-field and inter-frame basis and converting the format of said video information signal at each said identified scene discontinuity on the basis of information obtained from said video information signal on a corresponding one of an intra-field and intra-frame basis so as to obtain at least one of said motion adaptive video signal and said motion compensated video signal having said second format.

2. A method according to claim 1, in which said information relating to each said scene discontinuity is derived from an edit list.

3. A method according to claim 1, in which said information relating to each said scene discontinuity includes a list of time codes.

4. A method of converting a video information signal having a standard format and representing a plurality of scenes with discontinuities therebetween to a signal having 24 progressive scan frames per second and suitable for recording on photographic film, said method comprising the steps of:

reproducing information stored on a recording medium relating to each of said scene discontinuities and comparing the reproduced information to scene information contained in said video information signal so as to identify each of said scene discontinuities in said video information signal;

converting said video information signal to a motion compensated digital video signal having said 24 progressive scan frames per second, in which the converting of said video information signal at locations other than the identified scene discontinuities is based on information obtained from said video information signal on an inter-frame basis and in which the converting of said video information signal at each of said identified scene discontinuities is based on information obtained from said video information signal on an intra-frame basis;

recording said motion compensated digital video signal using a video signal recorder;

reproducing the recorded motion compensated digital video signal;

converting the reproduced motion compensated digital video signal to a motion compensated analog video signal corresponding to the 24 progressive scan frames per second so as to be suitable for recording on said photographic film.

5. A method according to claim 4, in which said video information signal includes a plurality of interlaced scan fields having a predetermined rate associated therewith and in which the step of converting said video information signal includes deriving from said video information signal a motion adapted progressive scan digital video signal containing a plurality of progressive scan frames having the same rate associated therewith as said interlaced scan fields of said video information signal, and deriving said motion compensated digital video signal from said motion adapted progressive scan digital video signal.

6. A method according to claim 5, in which said motion adapted progressive scan digital video signal includes blocks of video information, and in which the step of converting said video information signal further includes comparing each respective block of video information contained in a first frame of said motion adapted progressive scan digital video signal with a plurality of blocks in the following frame of said motion adapted progressive scan digital video signal for deriving motion vectors respectively representing motion between said first frame and said following frame of the video information contained in the respective blocks, and utilizing said motion vectors in deriving said motion compensated digital video signal.

7. Apparatus for converting a video information signal having a first standard format and representing a plurality of scenes with discontinuities therebetween to at least one of a motion adaptive video signal and a motion compensated video signal having a second standard format, said apparatus comprising:

means for reading information stored on a recording medium relating to each of the scene discontinuities and for comparing the read information to scene information contained in said video information signal so as to identify each of said scene discontinuities in said video information signal; and means for converting the format of said video information signal at locations other than the identified scene discontinuities based on information obtained from said video information signal on one of an inter-field and inter-frame basis and for converting the format of said video information signal at each of said identified scene discontinuities based on information obtained from said video information signal on a corresponding one of an intra-field and intra-frame basis so as to obtain at least one of said motion adaptive video signal and said motion compensated video signal having said second standard format.

8. Apparatus according to claim 7, in which said recording medium storing said information relating to each of said scene discontinuities is a magnetic disc.

9. Apparatus according to claim 7, in which said information relating to each of said scene discontinuities includes a list of time codes.

10. Apparatus for converting a video information signal having a standard format and representing a plurality of scenes with discontinuities therebetween to a signal having 24 progressive scan frames per second and suitable for recording on photographic film, said apparatus comprising:

means for reading information stored on a recording medium relating to each of the scene discontinuities and for comparing the read information to scene information contained in said video information signal so as to identify each of said scene discontinuities in said video information signal;

television standards converter means for converting said video information signal to a motion compensated digital video signal having said 24 progressive scan frames per second, in which said video information signal is converted at locations other than the identified scene discontinuities based on information obtained from said video information signal on an inter-frame basis and in which said video information signal is converted at each of said identified scene discontinuities based on information obtained from said video information signal on an intra-frame basis;

video signal recorder means for recording said motion compensated digital video signal;

reproducing means for reproducing the recorded motion compensated digital video signal;

digital-to-analog converter means for converting the reproduced motion compensated digital video signal to a motion compensated analog video signal corresponding to the 24 progressive scan frames per second so as to be suitable for recording on said photographic film.

11. Apparatus according to claim 10, in which said video information signal includes a plurality of interlaced scan fields having a predetermined rate associated therewith and in which said television standards converter means includes means for deriving from said video information signal a motion adapted progressive scan digital video signal containing a plurality of progressive scan frames having the same rate associated therewith as said interlaced scan fields of said video information signal and means for deriving said motion compensated digital video signal from said motion adapted progressive scan digital video signal.

12. Apparatus according to claim 11, in which said motion adapted progressive scan digital video signal includes blocks of video information and in which said television standards converter means further includes means for comparing each respective block of video information contained in a first frame of said motion adapted progressive scan digital video signal with a plurality of blocks in the following frame of said motion adapted progressive scan digital video signal for deriving motion vectors respectively representing motion between said first frame and said following frame of the video information contained in the respective blocks and means for deriving said motion compensated digital video signal in accordance with said motion vectors.

* * * * *